United States Patent [19]

Bergvall et al.

[11] 4,398,348

[45] Aug. 16, 1983

[54] DEVICE FOR MEASURING MOVEMENT OF MATERIAL USING A WHEEL ROLLING ON THE MATERIAL

[75] Inventors: Bengt A. Bergvall; Kenneth O. E. Skogward, both of Huskvarna, Sweden

[73] Assignee: Husqvarna Aktiebolag, Huskvarna, Sweden

[21] Appl. No.: 270,799

[22] Filed: Jun. 5, 1981

[30] Foreign Application Priority Data

Jun. 5, 1980 [SE] Sweden .................................. 8004226

[51] Int. Cl.³ ....................... D05B 27/08; B65H 25/20
[52] U.S. Cl. ................................ 33/133; 112/121.11; 226/11; 318/162
[58] Field of Search ................. 33/129, 132 R, 132 A, 33/133, 136; 112/75, 121.11; 226/11; 318/162

[56] References Cited

U.S. PATENT DOCUMENTS 3,025,444  3/1962  Myska ..................... 112/121.11 X
3,528,177  9/1970  Simjian ................................. 33/129
3,556,368  1/1971  Rene .................................... 226/11
3,980,032  9/1976  Kleinschmidt ............. 112/121.11 X
4,285,130  8/1981  Chandler .......................... 33/132 A

*Primary Examiner*—William D. Martin, Jr.
*Attorney, Agent, or Firm*—Alfred E. Miller

[57] ABSTRACT

A measuring device for measuring the distance of feed of cloth in a sewing machine, comprising a wheel driven by the cloth without slippage and located at the presser foot. A plurality of slits on the wheel are arranged to cooperate with two slits in the bracket of the wheel, and thereby form two light gates producing two output signals in the form of a two bit binary code. This light is detected by photo transistors or photo diodes positioned to receive light through the slits from light emitting diodes or lamps. The output signals from the unit are applied to a data unit connected to compute a positive or negative feed of the cloth. The invention is especially useful when a buttonhole is to be sewn totally automatically.

12 Claims, 7 Drawing Figures

DEVICE FOR MEASURING MOVEMENT OF MATERIAL USING A WHEEL ROLLING ON THE MATERIAL

This invention relates to a device for measuring distance and converting a number representing the measured distance to a digital form. The invention is especially adapted for use in a machine for measuring distances on a workpiece to be treated in a machine such as a sewing machine, and for guiding the operation of the machine during feeding of the workpiece, e.g. the forming of a fancy seam in a sewing machine.

A conventional device for measuring a distance is, for instance, a converter for converting an angular magnitude to a linear magnitude, e.g. converting a number of turns of a rotatable sensor which follows the linear motion. In order to have a good accuracy the rotation of the sensor must follow the feed piece exactly and the angular measurement must be effected with a fine distribution of the elements representing the angle.

The present invention is directed to an improvement of hitherto known converters of a linear motion of a determined magnitude to a thereof determined angle which, by electronic circuits, is converted to a digital number. As a result of such conversion, the measured magnitude can be used in a control system including a processing of data for performing of operations on a material. In the illustrated embodiment of the invention, the device is used in a sewing machine for guiding the stitch forming components in forming a special fancy seam. In this application of the invention the accuracy is great; the measuring device reacts to very small displacements of the material. It is also important that the device separates and assigns the right sign to displacements in the forward and backward directions respectively.

In order that the invention will be more clearly understood, it will now be disclosed in greater detail with reference to the accompanying drawings, wherein.

Figure 1:
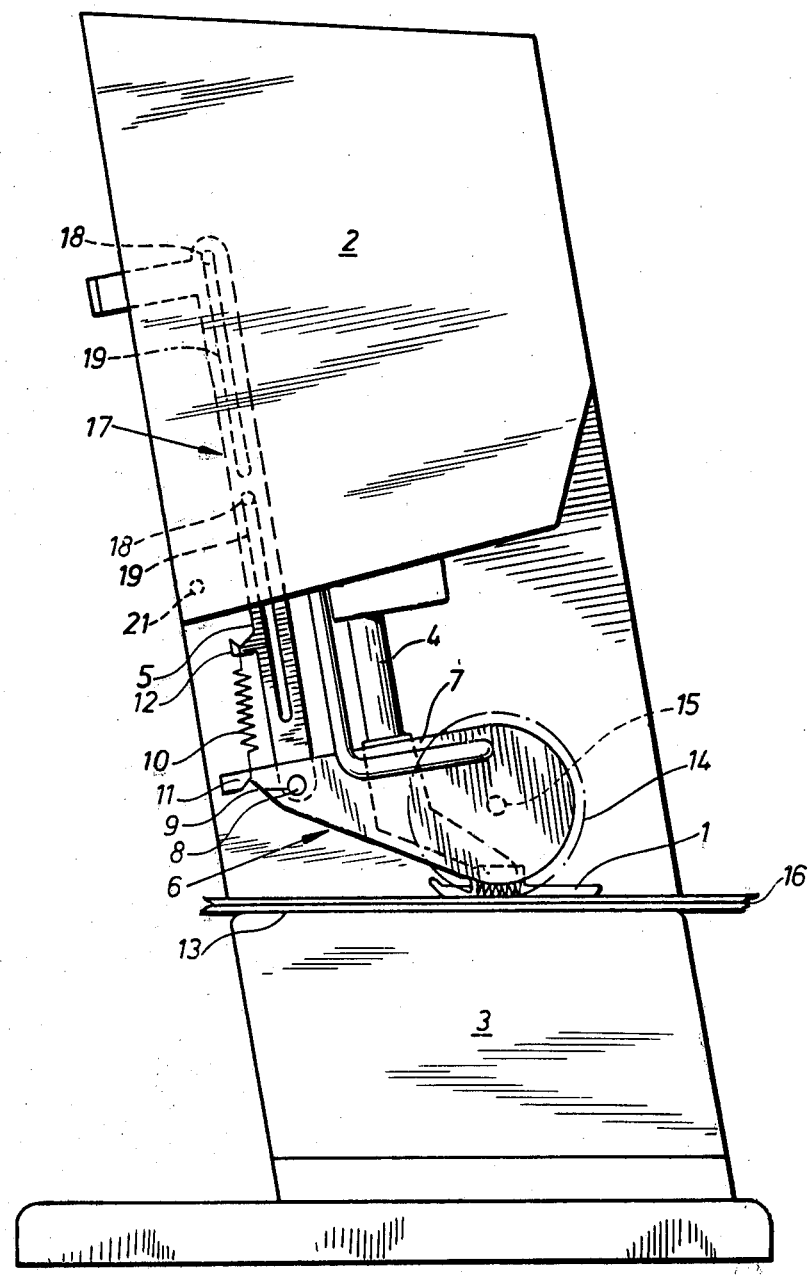
FIG. 1 is a simplified end view of a sewing machine embodying the measuring device of the invention.
Figure 2:
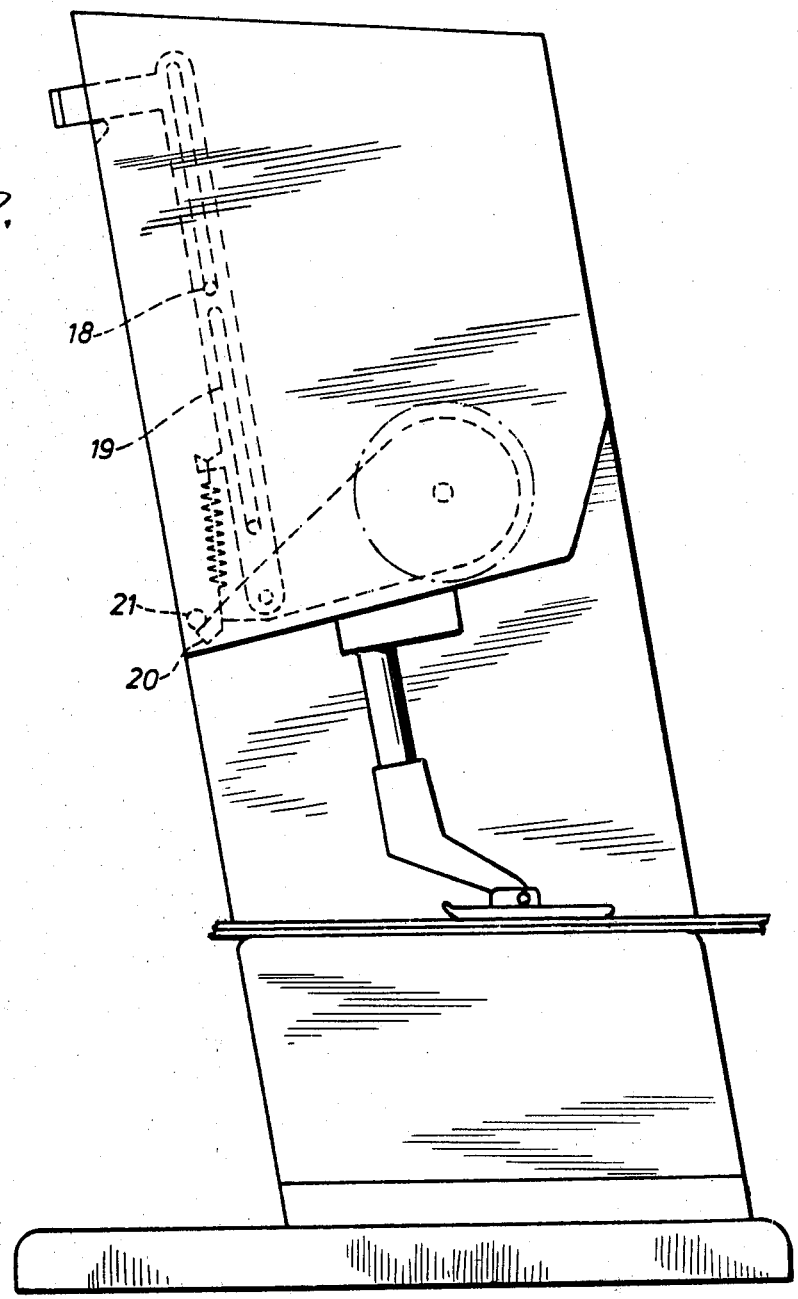
FIG. 2 is a view according to FIG. 1 showing the measuring device retracted in the sewing machine.

The sewing machine of FIG. 1 shown in an end view has a presser foot 1 and the conventional stitch forming instrumentalities are provided. These instrumentalities are the same as in conventional sewing machines, and comprise a needle bar mechanism and a shuttle mechanism positioned in the top arm 2 and the bottom arm 3 respectively of the machine. The presser foot is secured to a bar 4 in a usual way and is movable between an upper and a lower end position. Behind the presser bar is another vertically movable bar 5 which carries a sensor 6 on a bearing bracket 7. The sensor 6 will be discussed in greater detail with reference to FIGS. 3 and 4. One end of the bracket 7 has a bearing coupled to the bar 5 and including a pin 8, a hole 9, and a helical spring 10 extending between hook 11 on the bracket and hook 12 on the bar. The spring 10 forces the free end of the bracket in the direction toward the stitch plate 13. A toothed wheel 14 is journalled on a pin 15 at the free end of the bracket and pressed down by the spring 10 against a piece of cloth 16 fed along the lower arm 3. The toothed wheel rotates freely on the pin 15 and follows the motion of the cloth forwards as well as backwards. The sensor can be lifted from the position at the presser foot into the top arm, when it is not to be used (FIG. 2). The bar 5 is moved in a guide 17 including pins 18 engaging guide slots 19 in the bar 5, thus making the movement linearly displaceable but non-twistable. In the lifted position as shown in FIG. 2 the bearing bracket and the sensor are positioned in an opening in the underside of the upper arm, whereby the bracket is swung around the pin 18 upwards away from the sewing position, when a finger 20 thereon hits a stop 21 at the underside of the arm 2.

Figure 3:
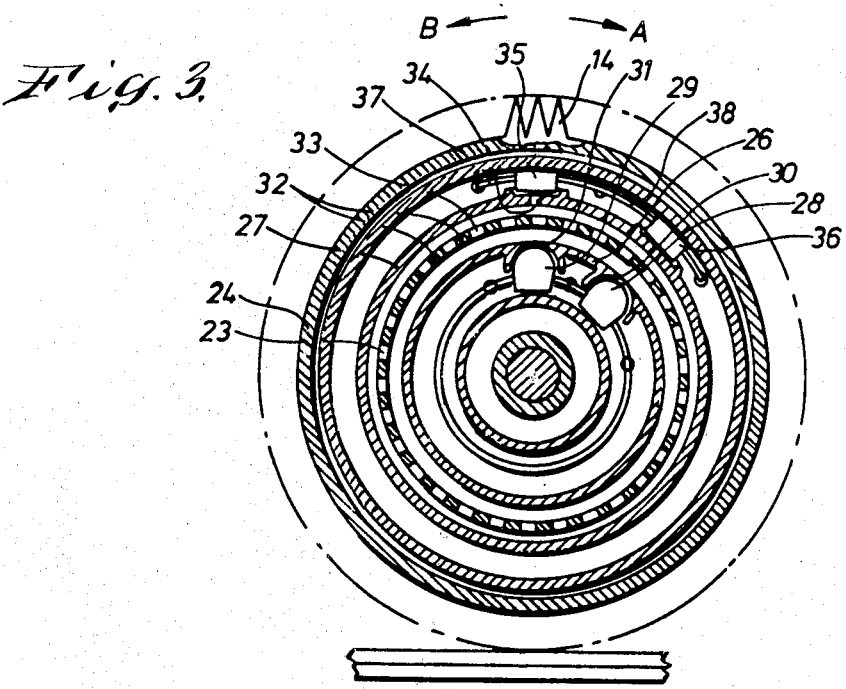
FIG. 3 is a transverse cross sectional view of the measuring sensor of the invention.
Figure 4:
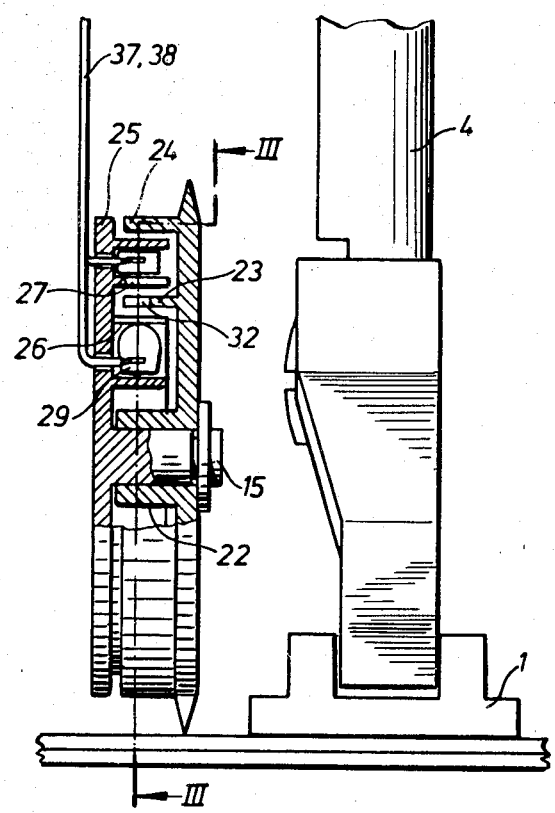
FIG. 4 is a partially longitudinal cross sectional view of the measuring sensor of FIG. 3.

The design of the measuring means in the illustrated embodiment is shown in FIGS. 3 and 4. The toothed wheel 14 has besides a bushing 22 a pair of concentric circular axially extending ridges 23, 24. A bearing shell 25 affixed to the bracket 7 has a pair of axially extending circular screens 26, 27 positioned inside and outside respectively the ridges 23. Inside of the screen 26 there are mounted two large lamps (light emitting diodes or the like) 28, 29 and a pair of holes 30, 31 in the screen admit the light from these lamps in a direction toward the ridge 23. Ridge 23 is outwardly along its periphery provided with teeth 32 and between these teeth are gaps 33 defining a digital pattern through which the light can pass radially outwards to the holes 34 in the screen 27, the ridge 23 thereby comprising a carrier for the digital pattern defined by said gaps. Outside of these holes two sensors such as photo transistors 35, 36 are positioned to receive the light emitted from the corresponding lamps 28, 29. The teeth 32 screen the light and cause pulsation of the light to the photo transistors when the wheel 14 rotates. Once for every light pulse which the transistor detects, the wheel rotates an angle equal to the pitch of the teeth on the ridge 23—the greater number of teeth (finer distribution) the smaller the angle between the pulses.

Figure 7:
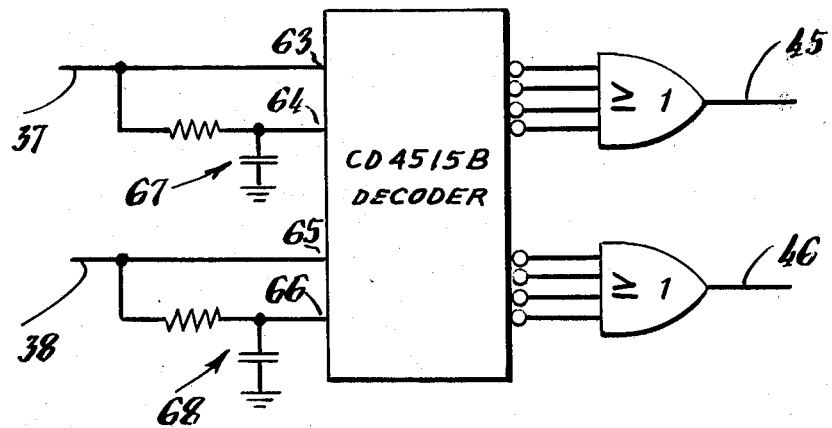
FIG. 7 is a block diagram of a decoder such as may be employed in the system of FIG. 5.

The provision of two lamps and transistors is necessitated by the fact that the direction of rotation of the wheel must be indicated. The indication of direction is expressed by the sequence of the electric pulses from the transistors 35, 36, which have output wires 37, 38 connected to a decoder (FIG. 7). As illustrated in FIG. 3 the teeth are somewhat displaced, when the wheel is in rest, in relation to the holes, so that the one hole is covered by a tooth while the other is open. The displacement in the tangential direction is equal to the width of half a tooth, which during a rotation is equal to the distance between the centers of two teeth, in order to produce a displacement of the light pulses in the following way, if light is denoted "1" and darkness "0" and the rotation is effected in accordance with the arrows A and B in FIG. 3 with the associated reading direction A' and B' in the following table:

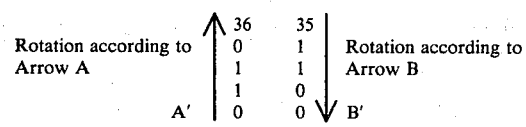

The successive bits from the transistors 35, 36 can, during rotation, be denoted "departing" and "arriving" respectively. A table with such "departing" and "arriving" codes for the one and the other rotation, respectively is as follows:

| Departing 36,35 | Arriving 36,35 | Rotation |
|---|---|---|
| 0 0 | 0 1 | B |
| 0 1 | 1 1 | " |
| 1 1 | 1 0 | " |
| 1 0 | 0 0 | " |
| 0 0 | 1 0 | A |
| 1 0 | 1 1 | " |
| 1 1 | 0 1 | " |
| 0 1 | 0 0 | " |

The generic term of binary code in which the bits change character at separate times is Gray-code, and the direction responsive two-bit code obtained by the now described arrangement is such a Gray-code. By the arrangement of other teeth and/or photo transistors, which are displaced with regard to the teeth 32 and the transistors 35, 36, respectively, the accuracy of the recording can be improved, e.g. by a thus obtained four-bit code.

The measuring device now to be described can be used in a system for automatic sewing of a buttonhole with an electronic sewing machine. The system is shown as a block diagram in FIG. 5, which also includes an arrangement 39 for measuring a button 40 of a size to fit the buttonhole. The measuring arrangement 39 includes a potentiometer 41 which supplies a voltage corresponding to the size of the button on a wire to an analog-digital converter 42 in which the voltage is encoded and applied to a comparator 43. The decoder 44 applies pulses to a pair of wires 45, 46 of which 45 is for counting upwards and 46 for counting downwards (in dependence of the direction of rotation of the wheel 14), these pulses being applied to a binary counter 47 which counts upwards with the pulses on the wire 45 and downwards with the pulses on the wire 46. A start contact 48 is provided on the machine and is actuated when a buttonhole is to be sewn; the start signal is applied to the counter 47 and another counter 49 and adjusts them to zero. The buttonhole sewing then starts with a space C of the buttonhole in the reverse direction (FIG. 6). This is indicated by a signal on a wire 50 from the counter 49. During the sewing the wheel 14 rotates and the counter counts pulses from the wire 45. When the binary number on the counter coincides with a number recorded on the comparator 43 from the converter 42, a pulse is released from the comparator on an output wire which together with a signal on the wire 50 in an AND-circuit 51' to an OR-gate 52 releases a counting pulse on a wire to the counter 49. The output signal of this counter then changes from the wire 50 to another output 53, wich means zero-rated feeding and bar stitches D. In order to make the machine sew a certain number of such stitches, a separate control circuit is provided with an arm shaft detector 54, a stitch counter 55, another comparator 56 and a memory 57, in which a predetermined binary number is recorded and transferred to the comparator 56. When the stitch counter outputs the same binary number (corresponding to the number of stitches) as the recorded number, the comparator applies a signal to a wire 58 which, together with the signal on the wire 53 in an AND-circuit 51" via the OR-gate 52, releases a counting pulse to the counter 49. As a result the output signal of the counter 49 changes from the wire 53 to a third output 59. This controls forward feeding and spoke stitches (FIG. 6). During forward feeding the wheel 14 rotates and the counter 47 counts pulses on the wire 46, i.e. counting down. When the count reaches zero a signal is supplied to an output 60 which, together with the signal on the wire 59 in an AND-circuit 51''' via the OR-gate 52, releases a counting pulse to the counter 49. This output signal of the counter 49 from the wire 59 to a fourth output 61, which controls zero-rated feeding and bar-stitches F. After the number of stitches stored in the memory 57 are sewn another signal on the wire 52 is given which triggers the counter 49 to the next output 62. This stops the machine. When the next buttonhole is to be sewn, the contact 48 is actuated again.

Figure 5:
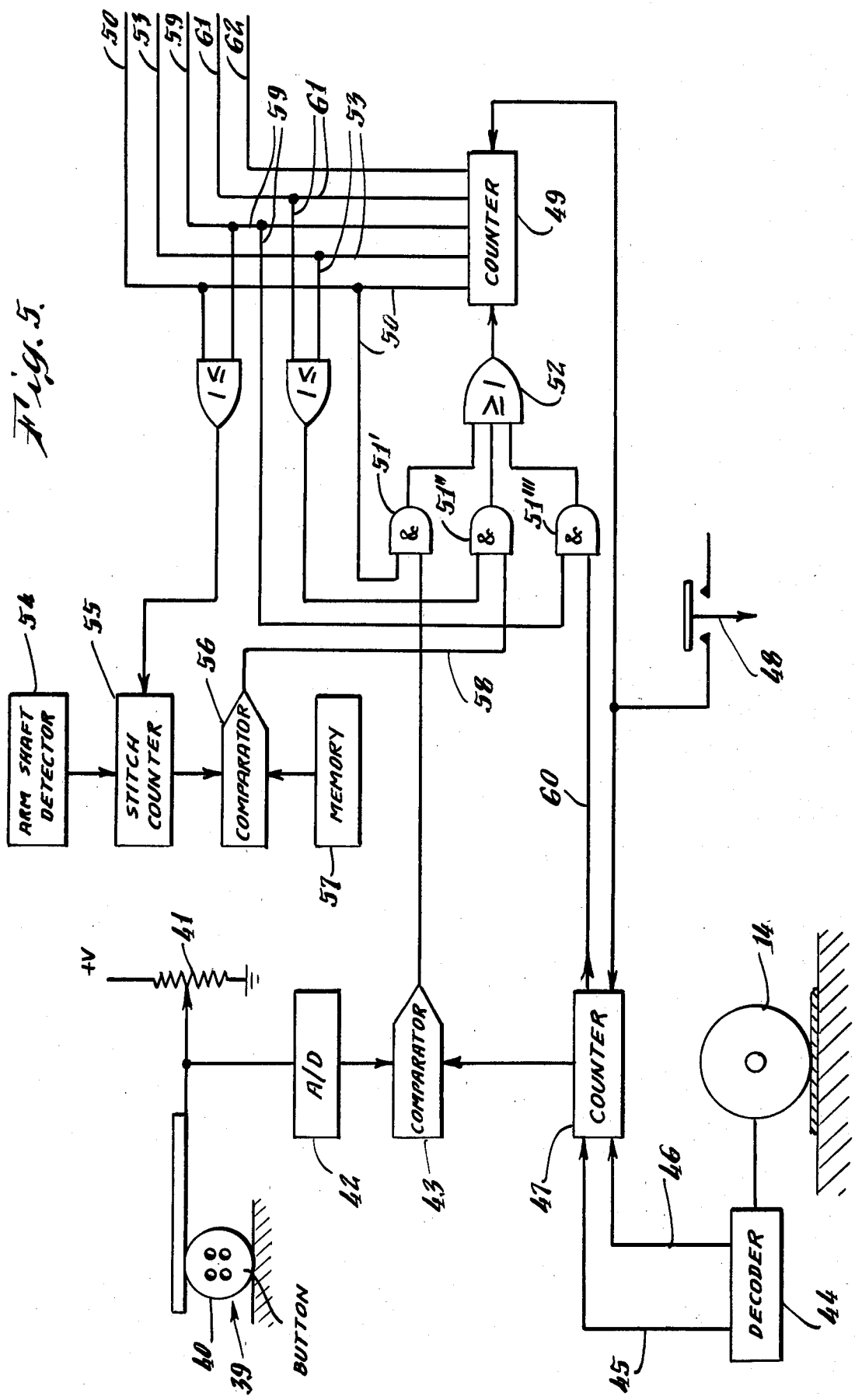
FIG. 5 is a block diagram of the control system of the invention.
Figure 6:
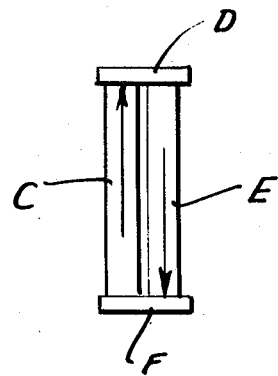
FIG. 6 is a plan view of a buttonhole such as may be sewn by the machine.

The diagram shown in FIG. 7 is an example of a decoder 44 in FIG. 5. The main part is a "1 of 16" decoder, which may be a standard integrated circuit type CD 451 B. The signals supplied by the photo transistors 35, 36 to the wires 37, 38 are fed to the inputs 63–66, of which the inputs 64, 66 get the signals via delay circuits 67, 68, so that arriving and departing codes are fed simultaneously, i.e. the departing code is delayed on the inputs 64, 66 until the arriving code is propagated directly to the inputs 63, 65. All inputs then receive the bits according to the above table, and the thus composed code is unique and determined by the current direction of rotation which is indicated on the wires, 45, 46 respectively.

While the invention has been disclosed and described with reference to a single embodiment, it will be apparent that variations and modifications may be made therein and it is intended that the following claims to cove each such variation and modification as falls within the true spirit and scope of the invention.

What is claimed:

1. In a measuring device for measuring movements of cloth fed by cloth feeding means for producing signals for controlling the cloth feeding means of a sewing machine, the improvement wherein said measuring device comprises measuring means including a digital pattern on a carrier and sensing means positioned to sense movement of said pattern with respect to said sensing means, said measuring means being positioned with one of said pattern and sensing means mounted to be driven directly with movement of cloth fed by said cloth feeding means, and further comprising a decoder for decoding the output of said sensing means, up-down counter means coupled to said decoder for counting in a direction determined by the direction of relative motion between said pattern and sensing means, and control circuit means coupled to said counter for providing said signals.

2. The measuring device of claim 1 wherein said measuring means is mounted adjacent said cloth feeding means, said control circuit means comprising means for producing signals responsive to the up and down counting in said counter for controlling the forward and reverse movement of said cloth feeding means.

3. The measuring device of claim 1 wherein said carrier comprises a wheel rotatable with respect to the sensing means.

4. The measuring device of claim 1 wherein said sensing means comprises a pair of spaced apart sensing elements adjacent said pattern, said pattern having a plurality of equally spaced apart characteristic surfaces, said sensing elements being spaced substantially one multiple of one fourth of the center distance between two adjacent of said characteristic surfaces of said pattern.

5. The measuring device of claim 4 wherein said sensing elements are opto-electric devices positioned to sense movement of said pattern by reflection or refraction.

6. The measuring device of claim 1 wherein said counter is connected to count forwards or backwards in dependence upon the order of succession of output pulses from said decoder.

7. The measuring device of claim 1 wherein said carrier comprises a wheel having teeth adapted to engage cloth being fed by said cloth feeding means, to be rotated by movement of said cloth, said pattern comprising an annular axially extending ridge on said wheel, said sensing means comprising first and second circumferentially spaced apart sensing elements mounted in one radial direction adjacent said ridge, and light emitting element positioned on the other side of said ridge for directing light through said pattern to said sending element.

8. The measuring device of claim 7 wherein said pattern comprises circumferentially equally spaced apart teeth extending axially with respect to said wheel, to periodically interrupt light directed to said sensing elements upon rotation of said wheel, whereby the output of said sensing elements is pulsatory.

9. The measuring device of claim 8 wherein said teeth are positioned to provide a Gray code output from said sensors in response to movement of said wheel.

10. The measuring device of claim 8 wherein the displacement of said sensing elements in the circumferential direction is equal to $N+M$, wherein N is the distance or an integral multiple thereof between adjacent teeth of said pattern, and M is a distance equal to the width of one half of a tooth.

11. The measuring device of claim 10 wherein the teeth of said pattern have widths substantially equal to the widths of the spaces therebetween.

12. The measuring device of claim 11 wherein said decoding means comprises one of sixteen decoder means.

* * * * *